C. C. SWANSON.
HUB ATTACHING DEVICE.
APPLICATION FILED FEB. 27, 1909.
941,470.
Patented Nov. 30, 1909.
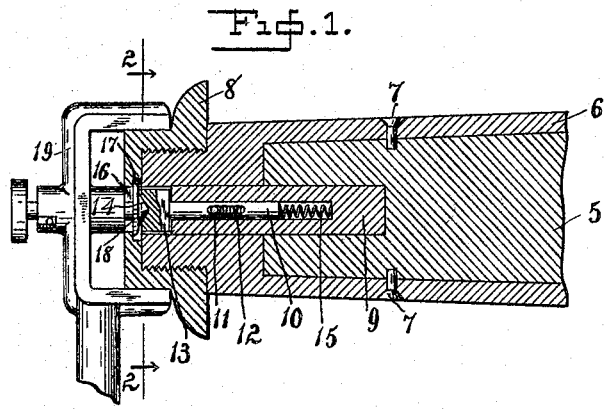
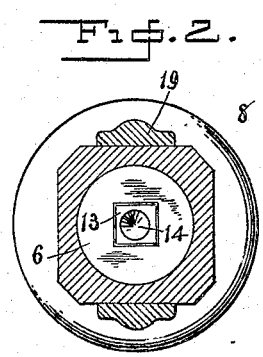
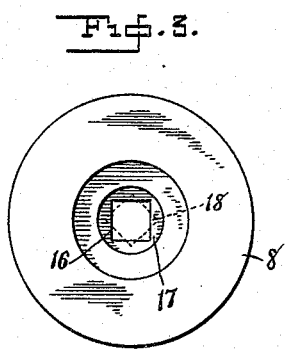
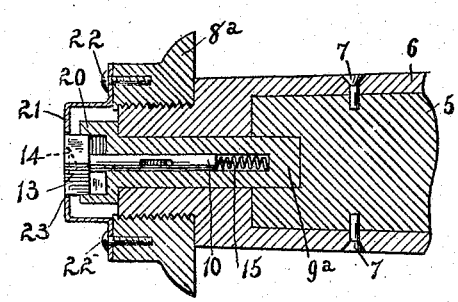
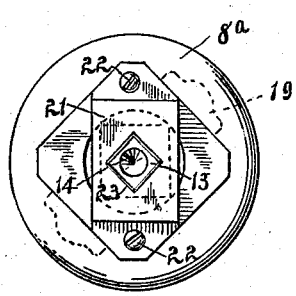
WITNESSES:
Mathew J. Marty
M. H. Milford
INVENTOR
Christopher C. Swanson
By Frederick Benjamin
ATTY.

UNITED STATES PATENT OFFICE.

CHRISTOPHER C. SWANSON, OF LAPORTE, INDIANA, ASSIGNOR OF ONE-HALF TO WILLIAM CONRY, OF LAPORTE, INDIANA.

HUB-ATTACHING DEVICE.

941,470.  Specification of Letters Patent.  Patented Nov. 30, 1909.

Application filed February 27, 1909. Serial No. 480,475.

*To all whom it may concern:*

Be it known that I, CHRISTOPHER C. SWANSON, citizen of the United States, residing at Laporte, in the county of Laporte and State of Indiana, have invented certain new and useful Improvements in Hub-Attaching Devices, of which the following is a specification.

This invention relates to improvements in axles for vehicles and the especial object of the improvements which form the subject matter of this application is to provide an axle or similar device from which the nut on the end cannot work loose accidentally and cannot be removed except by the use of a special tool.

A further object is to provide a device of this kind that can be economically manufactured, that will be strong and durable and that is not liable to get out of order.

In the accompanying drawing which forms a part of this application for patent, I have shown a preferred adaptation of my invention in the following views:—

Figure 1 is a longitudinal vertical section through a portion of an axle and its spindle to which my invention has been applied and showing the particular form of wrench which is required in order to remove the nut; Fig. 2 is a cross-section on the line 2—2 of Fig. 1; Fig. 3 is an end view of the spindle with the nut applied; Fig. 4 is a longitudinal vertical section of a slightly modified form, and Fig. 5 is an end view of the form shown in Fig. 4.

The wrench which is shown in this connection is the subject of a separate application for Letters Patent and only so much of same is shown herein as is necessary to indicate the operation of the particular invention covered by this application.

Referring to the preferred form of my invention, 5 represents one end of a wooden axle to which is applied a spindle 6 which in this instance is shown attached to the axle by countersunk screws 7. The outer end of the spindle has applied thereto a nut 8. The spindle and a portion of the axle is bored longitudinally to receive a cylindrical plug 9, the outer end of which terminates back of the outer surface of the spindle. Slidably arranged in the bore of the plug 9 is a bolt 10 which is held against rotation in said plug by a transverse pin 11 which passes through the plug and through a longitudinal slot 12 formed through the bolt 10. This bolt is provided with a rectangular head 13 in which is formed a countersink or conical recess 14. When the nut 8 is screwed up on the spindle 6, the head 13 of the bolt 10 is projected through an opening 16 in the center of the nut by the pressure of the expansion coiled spring 15 which is arranged within the bore of the plug 9 and normally presses against the inner end of the bolt 10. The head 13 of the bolt 10 being square fits loosely in the square opening 16 in the center of the nut 8 and thereby prevents the latter from working loose on the spindle or turning except when the proper tool, such as the wrench 19, is applied thereto. This wrench is provided with a spring actuated plunger having a conical end which is adapted to fit the recess 14 in the end of the bolt 10 and on the end of said plunger is a square flange 18 which is adapted to fit under the overhanging flange 17 of the nut 8.

As shown in Fig. 1 the wrench is in position for unscrewing the nut 8, the head of the bolt 13 being depressed by the action of the plunger of the wrench. The latter has oppositely arranged arms or gripping portions which embrace two sides of the nut in the usual way. When the flange 18 of the wrench plunger is turned so that its sides are at an angle to the sides of the opening 16 in the nut as indicated by dotted lines in Fig. 3, it will be apparent that the nut will be retained between the jaws of the wrench when it has been unscrewed as will be more fully pointed out in the copending application on the wrench filed herewith.

While I have shown the application of a plug 9 to the end of the axle and spindle, it will be apparent that if said parts are adapted to receive directly the bolt 10 and its complementary parts by boring out in the manner shown in respect to the plug, the latter may not be required. The application in this connection is shown for the purpose of illustrating the adaptation of my improved nut locking spindle to a spindle and axle of ordinary construction.

Where the nut is open at the end as shown in Fig. 4 in which the nut $8^a$ is indicated, I may attach to such nut the member 21. This consists of a sheet metal plate bent to form a housing for the recessed end 20 of the plug $9^a$. This plate is secured to the nut $8^a$ by screws 22 which are tapped into the outer face of said nut. The center of the plate is provided with a rectangular opening 23 which is adapted to receive the head 13 of the bolt 10 which corresponds to the form of bolt shown in Fig. 1 and is arranged and secured within the plug 9ª in the same manner as shown in Fig. 1.

In Fig. 4 a nut is shown screwed up on the spindle and when in that position the square head 13 projects into the squared opening 23 and thus prevents the turning of the nut until a suitable tool is applied which will not only unscrew the nut but will simultaneously depress the bolt 10 to a point which will disengage the latter from the plate 21.

It will be apparent that this device is applicable wherever it is desirable to secure a nut against accidental displacement due to the unscrewing of the nut and where it is desirable to have a particular style of tool other than an ordinary wrench for unscrewing the nut. I therefore do not wish to be limited to the particular application herein shown but

What I claim as new and desire to secure by Letters Patent, is:—

1. In combination with a spindle and a nut adapted to be screwed thereon, said spindle having an axial bore and said nut having a rectangular central opening, a plug seated in the bore of the spindle and having a recessed head, a bolt yieldingly and non-rotatably mounted in the bore of said plug and having a rectangular head adapted to normally engage the recessed head of the plug and the opening in said nut substantially in the manner and for the purpose set forth.

2. In a hub-attaching device, in combination with a spindle having an axial bore therein, a plug seated in said bore and having an axial bore therein, a bolt yieldingly and non-rotatably mounted in said plug, said bolt having a recessed head, and a nut adapted to be screwed on said spindle, and having an opening adapted to be engaged by the head of the bolt, substantially in the manner and for the purpose set forth.

3. In a hub-attaching device, in combination with a spindle having an axial bore therein, a plug seated in said bore and having an axial bore therein, a nut adapted to be screwed on said spindle and having an opening therein, a slotted bolt yieldingly mounted in the bore of said plug, and a pin passing through said plug and slot, said bolt having a conical recess in its head and the latter adapted to engage the opening in the nut.

4. In combination with a spindle and a nut adapted to threadably engage said spindle, the latter having a longitudinal bore therein, a plate secured to said nut and having an opening therein, a plug seated in the bore of the axle, said plug having a longitudinal recess therein, a bolt yieldingly and non-rotatably mounted in said recess, said bolt having a head adapted to engage the opening in said plate, substantially in the manner and for the purpose set forth.

In testimony whereof I affix my signature in the presence of two witnesses.

CHRISTOPHER C. SWANSON.

Witnesses:
FRANK E. OSBORN,
MATE G. LINE.